No. 788,765. PATENTED MAY 2, 1905.
C. S. FRANK.
PNEUMATIC TIRE.
APPLICATION FILED SEPT. 26, 1904.
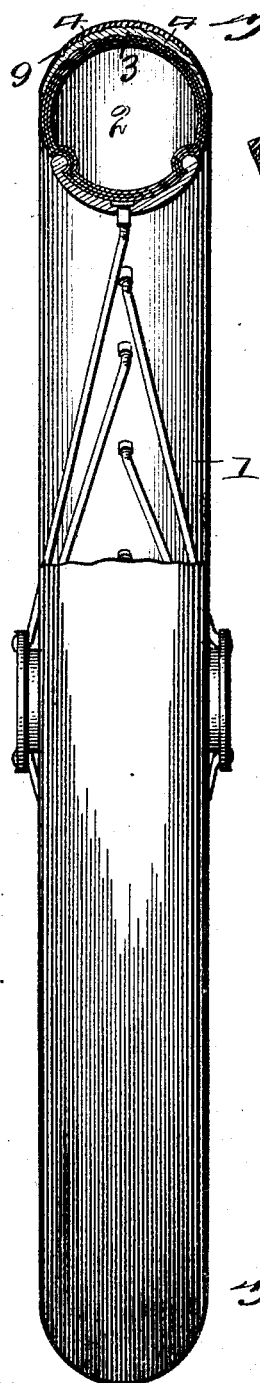
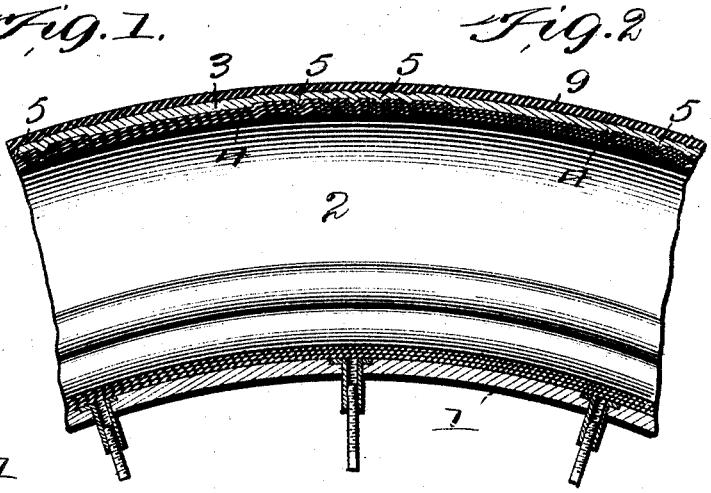
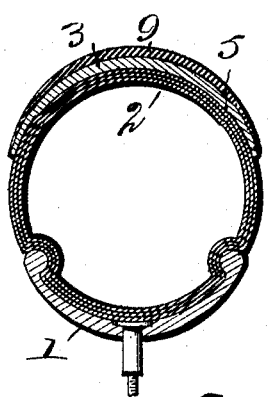
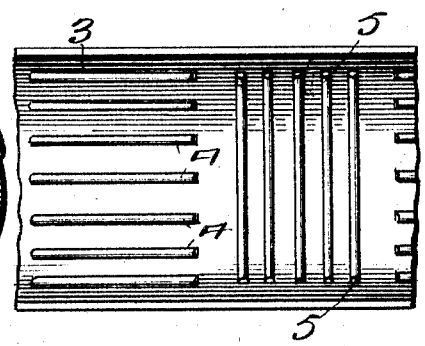
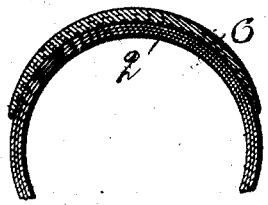
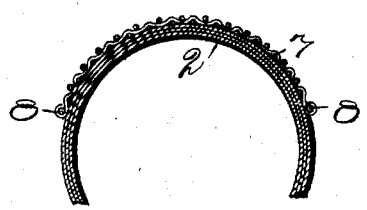
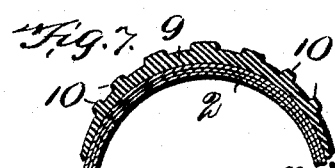
Inventor
C. S. Frank.

No. 788,765.

Patented May 2, 1905.

UNITED STATES PATENT OFFICE.

CHARLES SCOTT FRANK, OF EPWORTH, IOWA.

PNEUMATIC TIRE.

SPECIFICATION forming part of Letters Patent No. 788,765, dated May 2, 1905.

Application filed September 26, 1904. Serial No. 225,983.

*To all whom it may concern:*

Be it known that I, CHARLES SCOTT FRANK, a citizen of the United States, residing at Epworth, in the county of Dubuque and State of Iowa, have invented certain new and useful Improvements in Pneumatic Tires; and I do hereby declare the following to be a full, clear, and exact description of the invention, such as will enable others skilled in the art to which it appertains to make and use the same.

My invention relates to means for reinforcing the peripheral face of a pneumatic tire; and it consists of certain novel features of combination and construction of parts, the preferred form whereof will be hereinafter clearly set forth, and pointed out in the claim.

The main object of my invention, among others, is to provide means which will protect the wearing-face of a pneumatic tire for bicycles, automobiles, and other vehicles and which will prove reliably efficient in character and which may be readily placed in position upon the tire or as quickly removed therefrom.

Other objects and advantages will be hereinafter made clearly apparent, reference being had to the accompanying drawings, which are made a part of this application, and in which—

Figure 1 shows a sectional view of a tire provided with my reinforcing attachment. Fig. 2 shows a longitudinal sectional view of my attachment as applied to use upon a pneumatic tire. Fig. 3 is a transverse section on a slightly-enlarged scale from that shown in Fig. 1. Fig. 4 is a detail view showing the inner side of my reinforcement or protector for pneumatic tires. Figs. 5, 6, and 7 show other forms of construction which may be adopted in materializing my invention.

For convenience of reference to the various details and coöperating accessories of my invention numerals will be employed, the same numeral applying to a similar part throughout the several views.

Referring to the numerals on the drawings, 1 indicates the rim of a wheel of a bicycle or automobile or other vehicle, which may be made in the usual or any preferred way, while 2 designates the pneumatic tire or tube, usually made of some flexible material, as rubber properly reinforced with layers of canvas, as is well known, and in order to protect the wearing-face of the pneumatic tube thus or otherwise constructed I provide a reinforcing tire or band 3, designed to fit over the peripheral face of the finished wheel and which may be readily placed upon the pneumatic tire when the latter is in a collapsed or partially-collapsed condition, when said tire will afterward be inflated in the usual way. The wheels being usually made in standard sizes, it follows that my reinforcing tire or band may be correspondingly made, so that they will fit upon any wheel where its use is desirable, and to prevent the band from "creeping" or having a movement relative to the tire upon which it is disposed I provide for the inner face thereof a plurality of frictional devices, preferably a series of ribs 4, longitudinally disposed, and a corresponding plurality of ribs 5, transversely disposed, relative to the tire, and it therefore follows that the yielding material of the pneumatic tube will take into the spaces between said ribs or said ribs will take into a contiguous part of the tire, and thus be fully embedded therein, thereby insuring that the reinforcing-tire or metallic band 3 will be held against all movement relative to the pneumatic tube, or, in other words, will be held reliably to its work of providing a reinforcing-face for the tire. The wearing-face of the metallic band 3 is covered with a coating of rubber 9 or other resilient material, whereby the metallic band will be protected and the resultant noise created by the metal coming in contact with the earth will be obviated.

In Fig. 5 I have shown a reinforcing-band made of suitable composition, as rubber and canvas, and indicated by the numeral 6, while in Fig. 6 this reinforcing-band is made of meshed wire and indicated by the numeral 7, the edges 8 being strongly reinforced by a suitable wire, as clearly shown, all of said reinforcing-bands being made concavo-convex in cross-section, and thereby adapted to fit the peripheral face of the pneumatic tire-tube.

In Fig. 7 I have shown the covering 9 provided with spurs or projections 10 interspersed over the surface of said covering, whereby the wheels will be held from slipping when wet roads are encountered.

It is obvious that other forms of frictional devices than those illustrated may be employed, if desired, the main object being to hold the reinforcing-tire against slipping, as will be obviously necessary.

That form of reinforcing-band shown in Fig. 5 may be secured in any preferred way, as by suitable adhesive material, though it is thought that all of said forms of reinforcement will be held in place by a perfect inflation of the pneumatic tire-tube.

My reinforcing-tire may be made of any desired material, though it is thought that suitable sheet metal should be employed in forming that form of reinforcing-tire illustrated in Figs. 1, 2, 3, and 4.

My improved reinforcing-tire being made in sizes to fit the wheel, it may be readily placed in position thereon by permitting the pneumatic tire-tube to collapse or become exhausted of its air, when the reinforcing-band may be easily slipped in position and the tire again inflated, which will cause the tire-tube to take into the concave face of the reinforcing-band and will reliably protect the tread thereof against puncture and undue wear and also guard against undue strain in inflating the tire, permitting a much greater amount of air-pressure to be attained than would be possible without my reinforcement.

Believing that the construction and manner of using my improved reinforcing tire-band for pneumatic wheels have thus been made clearly apparent, further description is deemed unnecessary.

Having thus fully described my invention, what I claim as new, and desire to secure by Letters Patent, is—

The herein-described reinforcing-band for pneumatic tires comprising a band or tire proper adapted to fit around the tread of the pneumatic tire-tube, a series of ribs longitudinally disposed on the surface of said tire and a series of ribs transversely disposed relative to the tire intermediate each series of longitudinally-disposed ribs, and a resilient cover for said tire, all combined substantially as specified and for the purpose set forth.

In testimony whereof I have signed my name to this specification in the presence of two subscribing witnesses.

CHARLES SCOTT FRANK.

Witnesses:
GEORGE HARWOOD,
Mrs. G. HARWOOD.